Jan. 22, 1963  M. GRENON ET AL  3,074,874
NUCLEAR REACTORS
Filed May 6, 1958  5 Sheets-Sheet 1
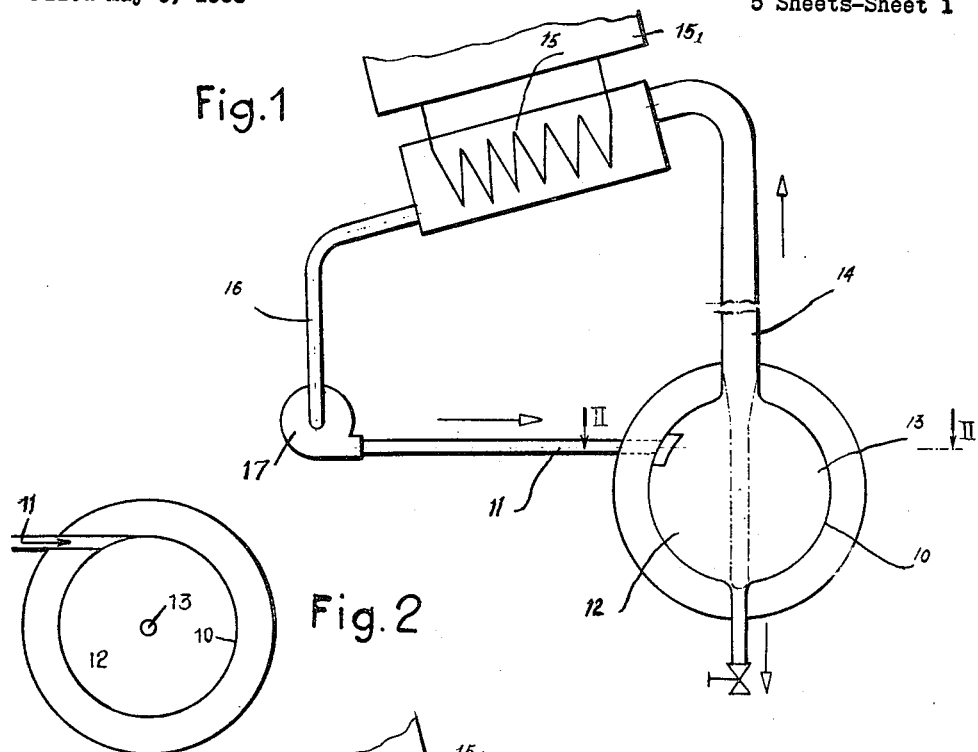
Fig.1
Fig.2
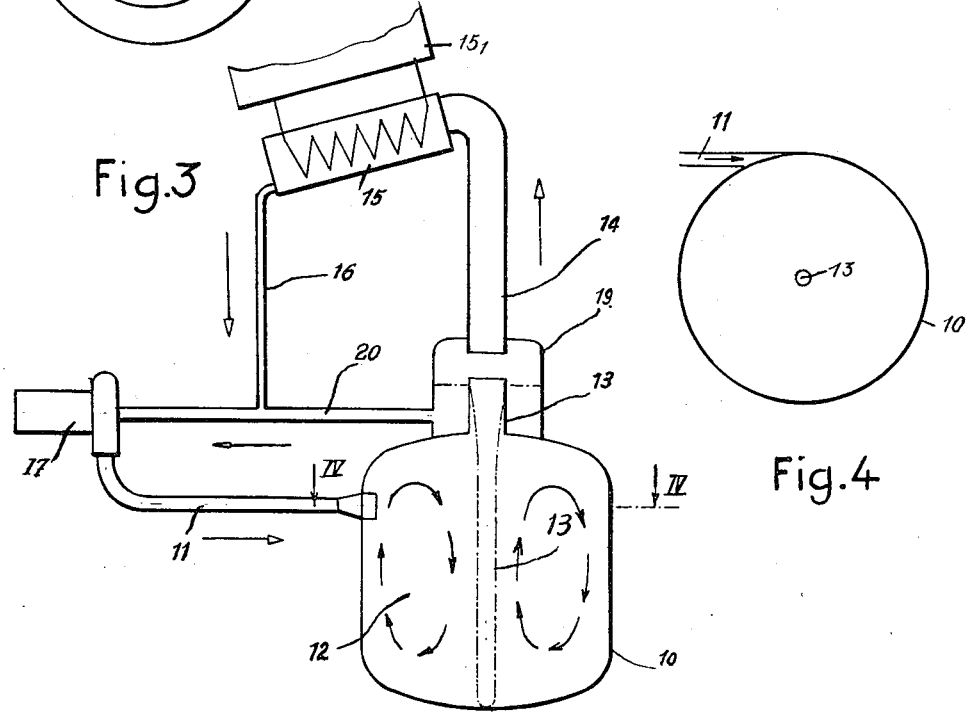
Fig.3
Fig.4

Jan. 22, 1963   M. GRENON ET AL   3,074,874
NUCLEAR REACTORS

Filed May 6, 1958   5 Sheets-Sheet 3

United States Patent Office 3,074,874
Patented Jan. 22, 1963

3,074,874
NUCLEAR REACTORS
Michel Grenon, Paris, and Louis Berthod, Georges Cohen de Lara, Michel Delachanal, and Georges Halbronn, Grenoble, France, assignors to Commissariat a l'Energie Atomique, Paris, France, a French state administration
Filed May 6, 1958, Ser. No. 733,432
Claims priority, application France May 10, 1957
6 Claims. (Cl. 204—193.2)

The present invention relates to nuclear reactors of the boiling liquid homogeneous type in which the fuel may be in the state either of a solution or of a suspension.

A boiling liquid reactor can be worked with advantage only if the specific power produced per liter of core volume is high and the critical mass is low.

A high specific power implies an important production of vapor per liter of core volume. On the contrary, a low critical mass implies a low spatial concentration of the vapor of the moderator (volume of vapor per unit of volume of the whole). These two conditions may be complied with by achieving a very quick withdrawal of the vapor as it is being produced.

There are at the present time three known types of boiling liquid homogeneous reactors to wit:

(a) Free boiling reactors in which the withdrawal of vapor, due to the buoyancy of the vapor bubbles in the fluid is facilitated by convection currents. The formation and separation of the vapor takes place in the core.

(b) Boiling liquid reactors with guided free circulation of the moderator, in which the withdrawal of the vapor is accelerated by guiding the circulation currents by means of baffles or funnels disposed in the core.

In both cases, the rate of withdrawal of the vapor and therefore the specific power of the reactor remain low.

(c) Boiling liquid reactors of the forced circulation type in which separation of the vapor and of the fluid takes place on the outside of the reactor; it is thus possible to extract great amounts of vapor from the core. Unfortunately the volume of fluid corresponding to the external circuit is not negligible with respect to that of the core which increases the amounts of fuel and of moderator to be used for operating the reactor.

Forced circulation may be produced by an external circuit in the form of a thermo-siphon or by a circulation pump. The necessity of extracting high amounts of vapor leads to conveying the fluid at high rates and also to accepting high pressure drops, which correspondingly reduces the effective power of the reactor.

A first object of our invention is to supply a boiling liquid reactor such that the volume of the external circuit is as small as possible, whereby the total volume of fuel and of moderator necessary for operating the reactor is not much higher than the volume of the core.

A second object of our invention is to provide a boiling liquid reactor in which the withdrawal of vapor takes place in an accelerated manner so as to obtain high specific powers.

The reactor according to our invention is characterised in that, the core acting both as a heat generator and as a vapor separator, the withdrawal of vapor is obtained through means producing in the core, which is stationary, a vortex flow of the active fluid.

The means used according to the invention may for instance consist in providing an inflow of fluid tangentially to the periphery of the core. The vortex movement produced in the mass of active fluid imparts to this kind of reactor high separating properties.

The particles lighter than the active fluid, such as vapor bubbles, are driven toward the center at a speed which is the higher as the difference of their density with that of the active fluid is greater. The gathering of the bubbles at the center of the core forms what will be hereinafter called a central "funnel" from which vapor can flow out at high speed.

In such an apparatus the force brought into play is the centrifugal force resulting from the tangential inflow of the liquid injected into the core and the centrifugal acceleration of the active fluid may be of an order of magnitude one hundred times greater than that obtained in the case of ordinary boiling.

It may be feared that in the case of a reactor making use of fuel in the state of suspension the particles, heavier than the active fluid, that are placed in suspension will be thrown out to the periphery. However, experience teaches that with very fine particles (averaging 15 microns for instance), this phenomenon does not take place and the secondary currents constantly return them into suspension. The possibility of constructing a suspension type reactor according to the invention is based on this property. But the invention also applies to reactors in which the active fuel is in the state of solution.

In order to reduce the necessary amount of fuel to be used on the outside of the core and to reduce the power of the injection pump, it is advantageous, in a type of reactor according to our invention, to limit the rate of injection of liquid into the core to the rate of production of condensate corresponding to the vapor produced. In the case of a reactor of the suspension type, this feature further permits of eliminating or at least reducing the wear of the pump by abrasion. However, in another type of reactor according to our invention, we withdraw from the reactor a portion of the active fluid to reinject it, together with the condensate, into the core in particular for the purpose of ensuring a regular and stable flow through the reactor.

The withdrawal of fluid may take place either in the reactor itself, in a manner analogous to that used for injection, or immediately at the outlet of the reactor.

In order to enable the boiling liquid reactor to respond at constant pressure to the variations of load of the utilization circuit, the variations of flow rate of vapor must take place with a practically constant spatial concentration in the reactor. This may easily be obtained, for instance by causing the flow rate through the circuit for injecting fluid into the core to be controlled by a valve or a variable speed pump actuated by the regulator of the utilization circuit. Calculation shows that, in a reactor according to our invention with constant spatial concentration, the power is proportional to the rate of injection into the core.

Preferred embodiments of our invention will be hereinafter described with reference to the accompanying drawings, given merely by way of example and in which:

FIGS. 1 and 2 show, respectively in vertical section and in horizontal section on the line II—II of FIG. 1, the core and some of the annexed elements of a boiling liquid homogeneous reactor made according to our invention.

FIGS. 3 and 4 are similar views, respectively, showing a modification of the embodiment of FIGS. 1 and 2.

Figure 8:
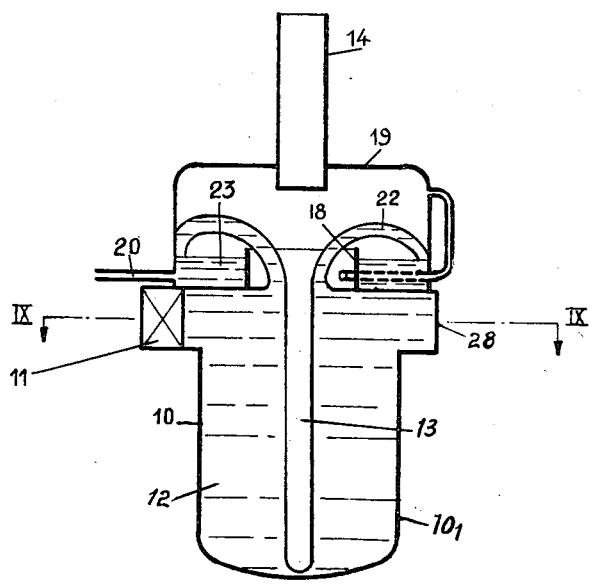
Figure 9:
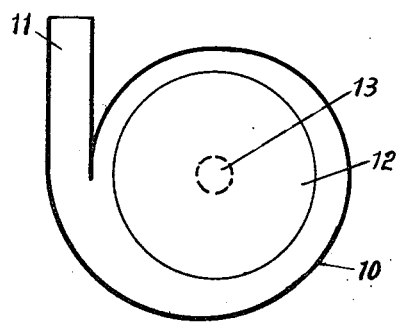

FIGS. 8 and 9 on the one hand and 10 and 11 on the other hand illustrate, respectively in vertical section and in horizontal section, two other embodiments of the invention.

In the construction of FIGS. 1 and 2, the core 10 of the reactor is of spherical shape. The stream of fluid is injected tangentially through pipe 11 into said core 10. The mass 12 of active fluid contained in the core is thus caused to rotate about a vertical axis, forming about said axis a hollow space constituting the above mentioned "funnel" 13. Under the effect of the centripetal force the vapor bubbles present in the liquid move at high speed toward said funnel so that a stream of vapor flows at high rate through said funnel 13 and the outlet conduit 14 into a heat exchanger 15 or the like cooperating with a receiver machine (turbine or the like) $15_1$. The condensate is then returned through conduit 16 to pump 17 which reinjects it into the core so as to maintain the vortex flow of the mass 12 of active fluid. In this embodiment, the tangentially injected fluid is therefore constituted by the condensate.

In the construction of FIGS. 3 and 4, the core 10 is of cylindrical shape. The tangential injection of fluid takes place through conduit 11. The vapor flowing out from mass 12 gathers in funnel 13 and passes through outlet conduit 14 to a heat exchanger 15. In this case also, the condensate is returned through conduit 16 to injection pump 17. However in this construction, it being supposed for instance that the flow rate of condensate is not sufficient to maintain the vortex flow of mass 12, this rate is increased by adding thereto some liquid recycled from said mass.

For this purpose, core 10 is provided with a tube 18 coaxial with funnel 13 and opening into a chamber 19. The amount of active fluid and the dimensions of said tube 18 are determined in such manner that, under normal working conditions, some liquid, generally a small amount, overflows from the end of tube 18 so as to supply the supplementary flow rate for injection.

Conduit 14 starts from the top of chamber 19, the dimensions of which are chosen sufficient to enable it to absorb and to compensate for the variations of the overflow at the end of tube 18 due to variations of the active fluid volume during the operation of the reactor. The fluid intended to be reinjected is collected through a conduit 20 starting from chamber 19.

Advantageously tube 18 may be made in the form of a degasing device of a known type so as to supply a drier vapor at the outlet of chamber 19.

Whatever be the construction that is chosen (that is to say with or without a recycling of liquid from the fluid mass in the core) in order to obtain a vortex movement similar to that obtained in cyclone apparatus used for industrial purposes, it has been found experimentally that the object of the invention is reached by making use of an inlet nozzle having an equivalent diameter from five to ten times smaller than the equivalent diameter of the core, whereas in an industrial cyclone apparatus this ratio generally ranges from two to three. As a matter of fact, the degasing problems which are met in industry consists in passing an important flow through the degasing cyclone or cyclones. This would be the case if the rotational circulation of the cyclone were used to extract the radiolitic gases in the core of a reactor of the pressurized type because the flow rates of active fluid brought into play for conveying heat are very important. On the contrary, in the case of a boiling liquid reactor, with which the present invention is concerned, the amount that is injected is much smaller because it is determined essentially for the purpose of maintaining the vortex movement in the core.

In a reactor of this kind, the mean density of the moderator may be very high and tend toward that of water at the temperature that is considered. For instance, in a spherical reactor (FIGS. 1 and 2) or a cylindrical reactor (FIGS. 3 and 4) having a diameter of 70 cm., it is possible to obtain a specific power of 40 kw. per liter with a mean spatial concentration of vapor which, owing to the great speed at which the vapor is evacuated, may be as low as 9 or 10%, the speed of inflow of the liquid into the core being 5 meters per second. This speed might be substantially increased, for instance up to 20 meters and even more, in particular in the case of reactors having scroll-shaped chambers as will be hereinafter described.

The characteristics of the rotational or vortex flow will be chosen advantageously such that the diameter of the central funnel ranges from 5 to 15 hundredths of the equivalent diameter of the vessel containing the active fluid, which means that the volume of this funnel corresponds to from 0.25 to 2.25% of the total volume of the core, thus involving a very little reduction of the neutron flux, that is to say of the power of the reactor. On the other hand, experience teaches that the diameter of the vortex varies little when the conditions of operation of the reactor are varied, which permits of obtaining a good stability of operation.

It should be noted that, as above specified, the rate of flow of the fuel injection at 11 into the core may be automatically adjusted as a function of the variations of load in the utilization circuit $15_1$ (FIG. 1). It is possible to act for this purpose on the speed of pump 17, on the position of the valves, on that of the distributing blades as hereinafter described, and so on.

Of course, the rotational movement of the active fluid in the core may be obtained through means different from those above stated, for instance by an axial inlet followed by fixed, or possibly movable, blades or merely by means of movable blades systems.

We will further describe in what follows some supplementary features which may be adopted.

According to one of these features relative to the withdrawal of fluid from the core to reinject it thereinto, we provide, at the outlet of said core, means for ensuring a good stability of the vapor funnel and for collecting of the proper amount of fluid without having vapor driven along with said fluid.

Figure 5:
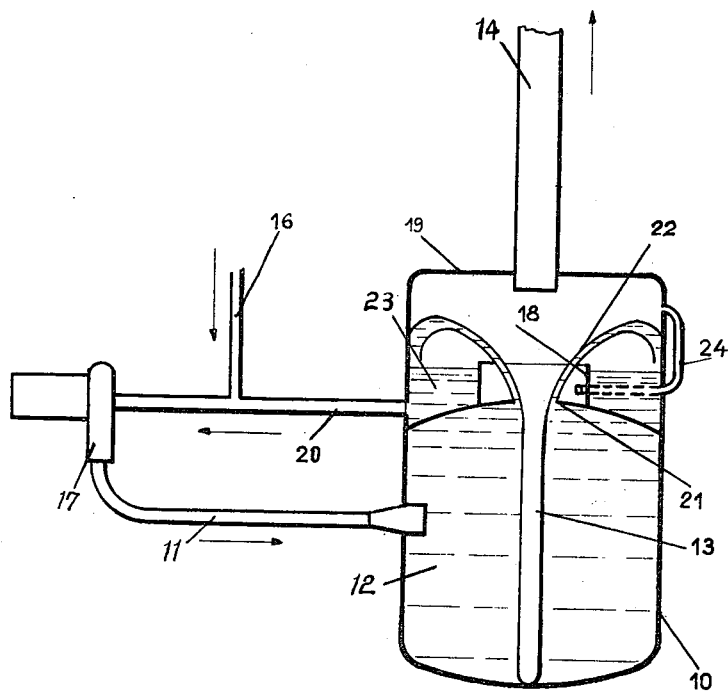
FIG. 5 is a vertical sectional view of another embodiment of a reactor according to the invention.

Such means are illustrated on FIG. 5.

Said FIG. 5 shows the same essential elements as above described. The collection of fluid to be reinjected at 11 is obtained by providing, in a thin partition located in vessel 10, an orifice 21 of a suitable diameter greater than the diameter of funnel 13 at the same level. This orifice 21 causes the formation of an annular sheet of liquid 22 which drops into an annular chamber 23 limited by a cylindrical wall 18. The fuel thus collected in said chamber 23 is led through conduit 20 to the injection pump 17.

The production of this sheet of liquid 22 is quite stable if some precautions, well known in the art of hydraulics, are taken. For instance, the space under said sheet 22 must be suitably vented. For this purpose, a conduit 24 places this space in communication with the space of chamber 19 above sheet 22.

The stability of the vapor funnel formed at 13 is thus substantially improved.

Figure 6:
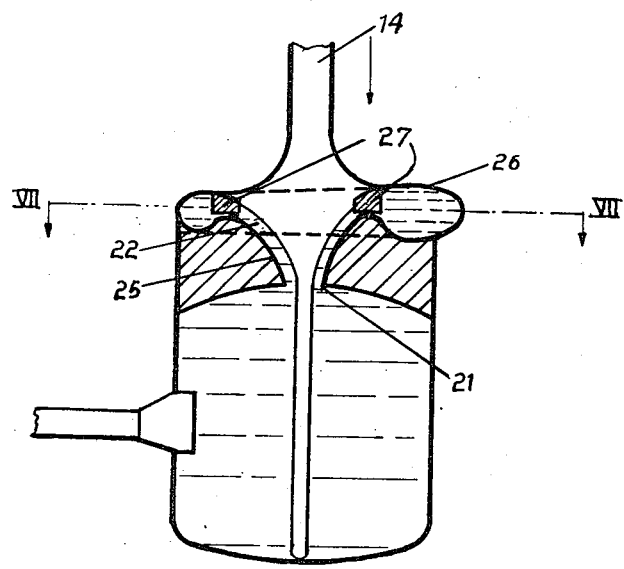
FIGS. 6 and 7 show, respectively in vertical section and in horizontal section on the line VII—VII of FIG. 6, another embodiment of the invention.
Figure 7:
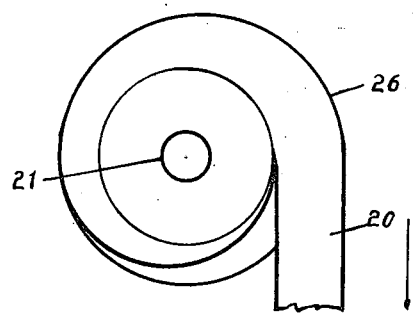

FIGS. 6 and 7 show another embodiment in which a similar sheet 22 is used but, in this case, said sheet, instead of being freely formed as in the arrangement of FIG. 5, is guided along the surface of an annular body 25 and is collected at the outer periphery in a chamber 26 of a shape analogous to that of the scroll chamber of a turbine, the vapor being evacuated through tube 14. The non spherical shape of chamber 26 has the advantage of preventing any possible accumulation of vapor at the top of said chamber 26, which would result in said vapor being reinjected into the core without passing through the heat exchanger.

Of course, any guiding means used in hydraulics such as guiding blades and the like may be provided to ensure the circulation of the fluid to chamber 26 without vapor being driven along together therewith.

For instance we may use guiding blades such as shown at 27 on FIG. 6 (these blades being not shown on FIG. 7).

According to another feature of our invention, the injection of fluid is effected in such manner as to ensure the best possible centering of funnel 13 with respect to the whole of the core vessel.

Experiments made with reactors such as that shown by FIG. 5 showed on the one hand that it is necessary to have a minimum flow rate of the injection fluid in order to obtain a funnel 13 of suitable shape and on the other hand that this funnel is often out of coincidence with the axis, which is of course undesirable.

In order to obviate this drawback and, in particular when the flow rate of injection is not too high and consequently its introduction involves but a low consumption of energy, even in the case of a single inlet, a good centering of the funnel may be obtained by giving the inner wall of the core, over the whole or a part of its height, a cross section in the form of a spiral and in particular of a logarithmic spiral, the vapor outlet orifice of the core vessel being located on an axis passing through the center of the spiral. In these conditions, the flow of fluid is such that, in the vicinity of the funnel, the system is of revolution.

When the injection of the minimum flow rate of liquid involves a high consumption of energy, it is advantageous to divide this minimum flow rate into several portions uniformly distributed over the circular periphery of the core so as to reduce the speed of injection. Experience teaches that the value of the necessary minimum flow rate remains the same.

Such a division of the flow rate may be obtained in an advantageous manner by injecting the fluid by means of a scroll-shaped inlet chamber surrounding the core over the whole or a part of its height, the vapour outlet of the core being mounted on the axis of the core, which is of cylindrical shape with a circular cross section.

FIGS. 8 and 9 illustrate an embodiment of our invention in which fluid is injected from conduit 11 into the upper part 28 of core 10, said part 28 having a cross section in the form of a logarithmic spiral, whereas the lower portion $10_1$ of the core is of cylindrical shape. Thus funnel 13 is exactly located along the axis of part $10_1$ and is very stable.

Figure 10:
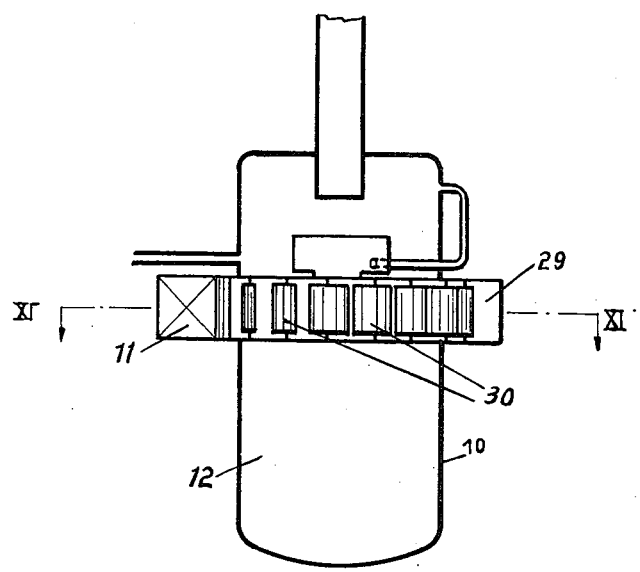
Figure 11:
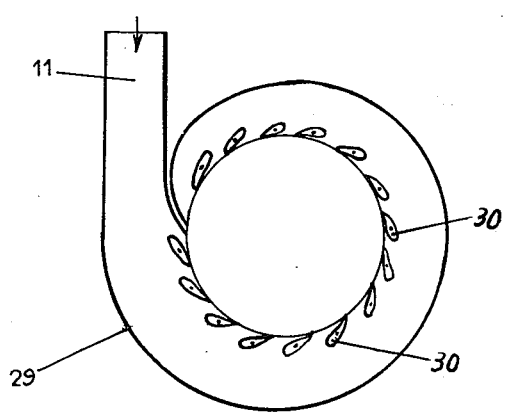

FIGS. 10 and 11 (on which the liquid flow has not been shown) illustrate another embodiment of the same kind.

The core 10 is of cylindrical shape and the liquid is injected for instance at the upper part of the core through a conduit 11 and a scroll-shaped chamber 29 provided with a set of movable guide blades 30 the position of which may be controlled through any suitable means not shown. We thus obtain a uniformly distributed feed and consequently a perfectly centered funnel. Furthermore this arrangement has the advantages of reducing the pressure drops and giving a possibility of regulation by means of the movable blades 30.

In constructions such as illustrated by FIGS. 8 and 9 or 10 and 11, it is advantageous to inject fluid only over a portion of the height of the core.

Furthermore in some cases the circulation inside the reactor may be improved by injecting the fluid not at the upper part of the core but at the lower part thereof.

The chief advantages of reactors according to the present invention are as follows:

A high specific power per liter of core volume and per kilogram of fuel,

A reduction of the amount of active fluid and of moderator circulating through the external circuits, which are reduced to a minimum, A reduction of the pumping power required for operating the reactor, A good regulation of the operating power, The fact that the position of the reactor has no influence upon its operation since it is based essentially on the action of the centrifugal force, this advantage being particularly interesting in the case of reactors to be mounted on vehicles.

Of course, changes may be made in the arrangement disposition and form of the parts without departing from the scope of the invention.

For instance, injection might take place through one or several orifices (slots, intervals between blades and so on) different from those shown by the drawings.

The walls of the cyclone device might have any suitable shape.

The reactor may include several zones according to a known principle.

In the case of a reactor having two zones, the fissionable material may be located in the body or the external envelope and the vortex flow device might be applied also to the extraction of vapor produced in the envelope.

What we claim is:

1. A nuclear reactor of the boiling liquid homogeneous type which comprises, in combination, a stationary core vessel in the form of a body having a vertical axis, a mass of liquid, consisting of a liquid moderator with nuclear fuel therein, filling said vessel up to a distance from the top thereof, said core vessel having at the top thereof an outlet located substantially along said axis, a partition in said vessel, extending transversely to said axis and located at a distance therefrom, said partition being provided at its center with a circular hole having its center on said axis, at least one liquid injector mounted at the periphery of said vessel at a level intermediate between the bottom thereof and said partition, said injector opening into said vessel tangentially to the inner wall thereof, for injecting liquid into said vessel and producing therein a vortex flow of said liquid whereby vapor from said liquid is fed centripetally toward said axis to form a vortex extending through said hole so that said vapor flows out from said vessel through said outlet, a heat exchanger having its inlet connected with said core vessel outlet, means in said vessel above said partition forming a liquid-containing chamber surrounding said axis and extending along the inner wall of said vessel, whereby an annular sheet of liquid may flow from the part of said vessel located under said partition to said chamber through an annular interval left between the edge of said hole and the vapor vortex passing therethrough, and a pump having its input connected both with the outlet of said heat exchanger and with the outer periphery of said liquid-collecting chamber and its output connected with said injector for feeding the condensate formed in said heat exchanger and the liquid collected in said chamber to said injector.

2. A nuclear reactor according to claim 1 in which the inner wall of said liquid-collecting chamber consists of a cylindrical wall of the same diameter as said hole and forming an upward extension thereof having its upper end opposite said outlet but at a distance therefrom.

3. A nuclear reactor according to claim 1 in which the inner wall of said liquid-collecting chamber consists of a cylindrical wall carried by the top face of said partition coaxial with said hole but of a diameter greater than it, the top of said cylindrical wall being at a distance from the top of said vessel.

4. A reactor according to claim 1 which further includes a wall in the form of a portion of an annular body of revolution extending in said vessel from said hole to the inner periphery of said chamber, said wall flaring up toward said outlet and being of curvilinear axial section, with its convexity toward said axis, so as to guide a sheet of liquid from said hole to said chamber.

5. A reactor according to claim 1 which further includes a wall in the form of a portion of an annular body of revolution extending in said vessel from said hole to the inner periphery of said chamber, said wall flaring up toward said outlet and being of curvilinear axial section, with its convexity toward said axis, so as to guide a sheet of liquid from said hole to said chamber, the sections of said chamber by horizontal planes being spirals having their center in said axis.

6. A reactor according to claim 5 further including guiding blades at the inner periphery of said chamber.

References Cited in the file of this patent

UNITED STATES PATENTS

| | | |
|---|---|---|
| 2,902,424 | King | Sept. 1, 1959 |
| 2,945,794 | Winters et al. | July 19, 1960 |

OTHER REFERENCES

CF-54-6-180 Two Region Homogeneous Reactor Without a Core Tank, 7 pages, June 23, 1954, declassified Dec. 20, 1955.

Proceedings of the International Conference on the Peaceful Uses of Atomic Energy Held in Geneva August 8-20, 1955, United Nations, New York, 1956, vol. II, pp. 381 and 390; vol. III, pp. 273 and 275.